(12) United States Patent
Sadacharam et al.

(10) Patent No.: US 11,567,628 B2
(45) Date of Patent: Jan. 31, 2023

(54) COGNITIVE COMPOSITION OF MULTI-DIMENSIONAL ICONS

(71) Applicant: INTERNATIONAL BUSINESS MACHINES CORPORATION, Armonk, NY (US)

(72) Inventors: Saravanan Sadacharam, Chennai (IN); Vijay Kumar Ananthapur Bache, Bangalore (IN); Vijay Ekambaram, Chennai (IN); Padmanabha Venkatagiri Seshadri, Mysore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 16/027,673

(22) Filed: Jul. 5, 2018

(65) Prior Publication Data

US 2020/0012409 A1 Jan. 9, 2020

(51) Int. Cl.
*G06F 3/00* (2006.01)
*G06F 3/04817* (2022.01)
*G06T 19/20* (2011.01)
*G06F 3/04815* (2022.01)

(52) U.S. Cl.
CPC ...... *G06F 3/04817* (2013.01); *G06F 3/04815* (2013.01); *G06T 19/20* (2013.01)

(58) Field of Classification Search
CPC .. G06F 3/04817; G06F 3/04815; G06T 19/20
See application file for complete search history.

(56) References Cited

U.S. PATENT DOCUMENTS

| | | | |
|---|---|---|---|
| 5,548,692 A | 8/1996 | Cok | |
| 5,745,715 A | 4/1998 | Pickover et al. | |
| 5,748,927 A | 5/1998 | Stein et al. | |
| 5,831,617 A | 11/1998 | Bhukhanwala | |
| 6,003,034 A | 12/1999 | Tuli | |
| 6,476,831 B1 | 11/2002 | Wirth et al. | |
| 6,535,872 B1 * | 3/2003 | Castelli | G06F 16/248 |
| 6,865,719 B1 | 3/2005 | Nicholas, III | |
| 7,548,955 B2 | 6/2009 | Nicholas, III | |
| 7,571,182 B1 * | 8/2009 | Eddy | G06F 16/283 |
| 7,610,294 B2 * | 10/2009 | Borgsmidt | G06Q 40/00 |
| 7,991,804 B2 * | 8/2011 | Battagin | G06F 40/18 |
| 8,065,345 B2 * | 11/2011 | Robertson | G06F 16/242 |
| | | | 707/805 |

(Continued)

*Primary Examiner* — Roberto Borja
*Assistant Examiner* — Andrew Chung
(74) *Attorney, Agent, or Firm* — Brian Restauro; Andrew D. Wright; Calderon, Safran & Cole, P.C.

(57) ABSTRACT

Systems and methods for cognitive composition of multi-dimensional icons and interactions are disclosed. In embodiments, a computer-implemented method comprises: generating, by a computing device, interaction logs based on user context data received; identifying, by the computing device, one or more target applications and associated scripts; automatically generating, by the computing device, a multi-dimensional icon for the one or more target applications based on the interaction logs, wherein the multi-dimensional icon comprises a geometric structure including content cells; allocating, by the computing device, the scripts to respective content cells of the multi-dimensional icon.

20 Claims, 6 Drawing Sheets

(56) References Cited

U.S. PATENT DOCUMENTS

| | | | | |
|---|---|---|---|---|
| 8,271,898 B1* | 9/2012 | Mattos | G06F 3/0485 | 715/784 |
| RE43,742 E | 10/2012 | Baar et al. | | |
| 8,676,801 B2* | 3/2014 | Gong | G06F 16/2264 | 707/736 |
| 8,842,080 B2* | 9/2014 | Freedman | G06F 3/04847 | 345/173 |
| 9,299,186 B2 | 3/2016 | Shoemaker et al. | | |
| 9,465,891 B1* | 10/2016 | Kagan | G06F 16/904 | |
| 9,886,793 B1* | 2/2018 | Ekambaram | G06T 17/20 | |
| 10,409,456 B2* | 9/2019 | Bejot | G06F 3/04815 | |
| 2001/0016855 A1* | 8/2001 | Hiroshige | G06F 16/283 | 715/227 |
| 2002/0184260 A1* | 12/2002 | Martin | G06F 40/18 | 715/213 |
| 2006/0271507 A1* | 11/2006 | Anzalone | G06F 16/2358 | |
| 2007/0061611 A1* | 3/2007 | Mackinlay | G06F 3/04817 | 714/5.1 |
| 2007/0070066 A1* | 3/2007 | Bakhash | G06F 3/04815 | 345/419 |
| 2007/0109298 A1* | 5/2007 | Elmieh | H04M 1/72544 | 345/419 |
| 2007/0225961 A1* | 9/2007 | Ritts | G06F 11/3664 | 703/21 |
| 2008/0049015 A1* | 2/2008 | Elmieh | G06T 13/20 | 345/420 |
| 2008/0238916 A1* | 10/2008 | Ghosh | G06T 19/00 | 345/419 |
| 2008/0256122 A1* | 10/2008 | Dong | G06F 3/0481 | |
| 2009/0327883 A1* | 12/2009 | Robertson | G06F 16/44 | 715/273 |
| 2010/0162215 A1* | 6/2010 | Purcell | G06F 8/77 | 717/127 |
| 2011/0208690 A1* | 8/2011 | Cushing | G06F 16/283 | 707/602 |
| 2012/0005622 A1* | 1/2012 | Park | G06F 3/0482 | 715/782 |
| 2012/0079431 A1* | 3/2012 | Toso | G06Q 40/06 | 715/836 |
| 2012/0117536 A1* | 5/2012 | Elmieh | G06F 8/71 | 717/110 |
| 2012/0192115 A1* | 7/2012 | Falchuk | G06F 3/04883 | 715/850 |
| 2012/0200567 A1* | 8/2012 | Mandel | G06T 11/206 | 345/420 |
| 2012/0260217 A1 | 10/2012 | Celebisoy | | |
| 2012/0260218 A1 | 10/2012 | Bawel | | |
| 2013/0054608 A1* | 2/2013 | Gong | G06F 16/2264 | 707/741 |
| 2013/0100133 A1* | 4/2013 | Elber | G06T 19/20 | 345/420 |
| 2013/0159245 A1* | 6/2013 | Frederiksen | G06F 16/254 | 707/602 |
| 2013/0254696 A1* | 9/2013 | Cragun | G06F 3/04883 | 715/771 |
| 2013/0263280 A1* | 10/2013 | Cote | G06F 21/62 | 726/26 |
| 2013/0304537 A1* | 11/2013 | Johnston | G06Q 50/163 | 705/7.29 |
| 2014/0279833 A1* | 9/2014 | Gong | G06F 16/254 | 707/602 |
| 2015/0019980 A1 | 1/2015 | White | | |
| 2015/0154796 A1* | 6/2015 | Co | G06T 17/20 | 345/420 |
| 2017/0003851 A1* | 1/2017 | Moore | G06F 3/04815 | |
| 2017/0221274 A1* | 8/2017 | Chen | G06T 19/20 | |
| 2017/0277168 A1* | 9/2017 | Tanaka | G05B 19/4099 | |
| 2018/0018075 A1* | 1/2018 | Heully | G06F 3/04815 | |
| 2018/0107726 A1* | 4/2018 | Dwivedi | G06F 16/26 | |
| 2019/0147665 A1* | 5/2019 | Banavara | G06K 9/00355 | 345/419 |
| 2019/0347842 A1* | 11/2019 | Henry | G06T 13/80 | |
| 2019/0384460 A1* | 12/2019 | Harnisch | G06F 9/445 | |
| 2019/0392069 A1* | 12/2019 | Lim | G06F 16/2455 | |
| 2020/0057770 A1* | 2/2020 | Dwivedi | G06F 16/283 | |

* cited by examiner

COGNITIVE COMPOSITION OF MULTI-DIMENSIONAL ICONS

BACKGROUND

The present invention relates generally to multi-dimensional icons, and, more particularly, to cognitive composition of multi-dimensional icons.

User-selectable icons are common mechanisms for triggering software applications in a computer based graphical user interface. Typically, such icons are two-dimensional and display a single image or play a single video clip or dynamic illustration. As the number of software applications utilized by a single device increases, new methods of organizing software application icons have been explored. One method of organizing software application icons involves the use of three-dimensional (3D) icons that can be rotated to show an assortment of information or data. Typically, such 3D icons are designed and constructed by third party developers, and made available to users or manufacturers for use in user computer devices. Other solutions enable users to manually create 3D icons devoted to user-selected subject matter, such as a social media cube depicting various social media applications of the user.

SUMMARY

In an aspect of the invention, a computer-implemented method includes: generating, by a computing device, interaction logs based on user context data received; identifying, by the computing device, one or more target applications and associated scripts; automatically generating, by the computing device, a multi-dimensional icon for the one or more target applications based on the interaction logs, wherein the multi-dimensional icon comprises a geometric structure including content cells; allocating, by the computing device, the scripts to respective content cells of the multi-dimensional icon.

In another aspect of the invention, there is a computer program product comprising a computer readable storage medium having program instructions embodied therewith. The program instructions are executable by a computing device to cause the computing device to: determine a structure for a multi-dimensional icon based on historic user context data regarding application display states and interactions; generate the multi-dimensional icon based on the structure, wherein the multi-dimensional icon comprises a plurality of application content cells: rank a plurality of scripts based on the historic user context data; allocate the scripts to the plurality of application content cells based on the ranking of the scripts; and allocate one or more gestures to the plurality of application content cells, wherein the one or more gestures are each in the form of a computer-recognized graphical user interface interaction.

In another aspect of the invention, there is a system including a processor, a computer readable memory and a computer readable storage medium associated with a computing device; program instructions to identify a target application; program instructions to determine a geometric structure for a multi-dimensional icon based on historic user context data regarding application display states and interactions, wherein the structure comprises a plurality of cells associated with content of the target application; program instructions to generate the multi-dimensional icon based on the geometric structure; program instructions to rank a plurality of scripts based on the historic user context data; program instructions to allocate the scripts to the plurality of cells based on the ranking of the scripts; and program instructions to allocate one or more gestures to the plurality of cells; wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
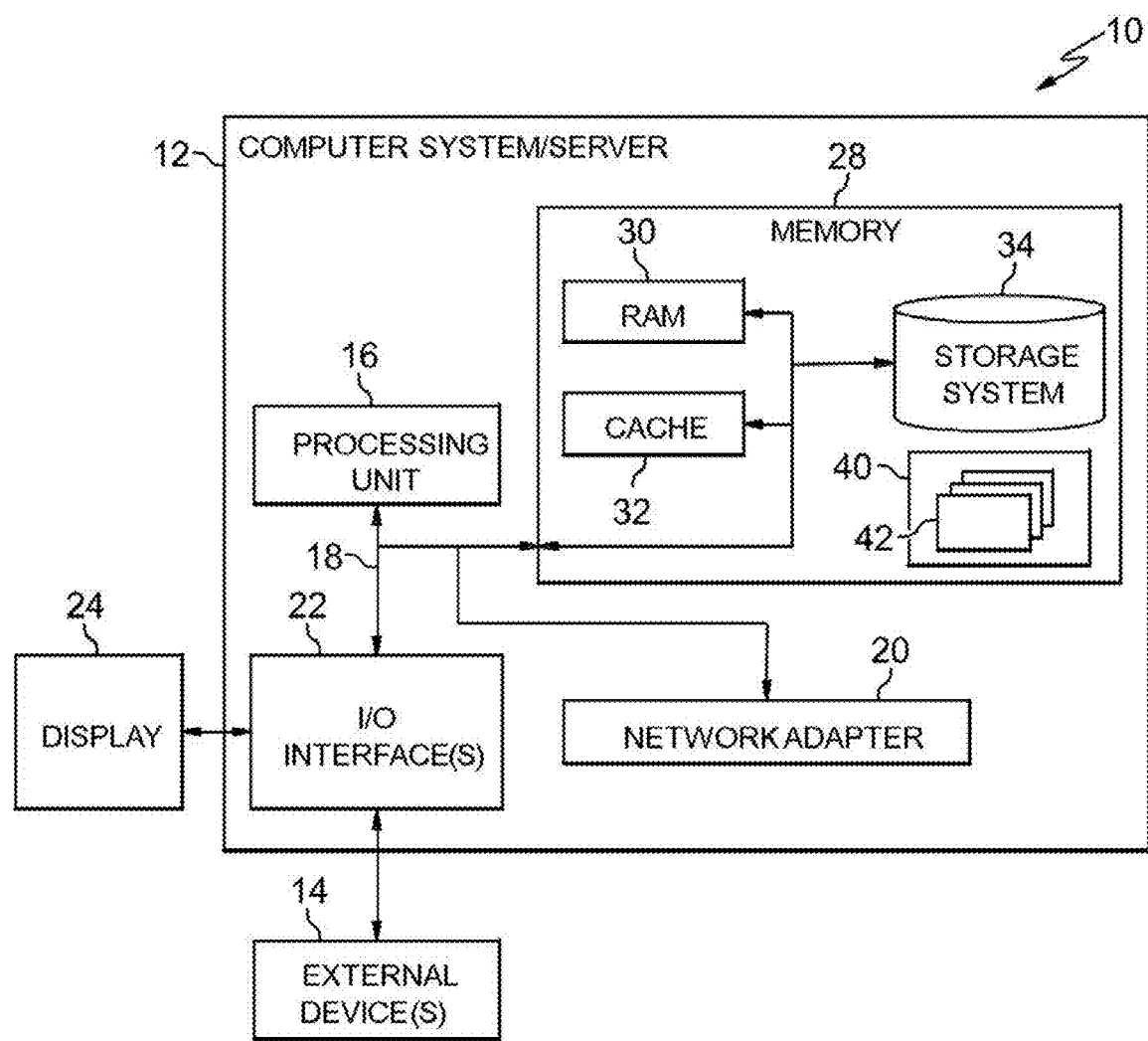
FIG. 1 depicts a computing infrastructure according to an embodiment of the present invention.

The present invention relates generally to multi-dimensional icons, and, more particularly, to cognitive composition of multi-dimensional icons. In embodiments, a system facilitates cognitive composition of multi-dimensional icons and interactions. In aspects, a system enables automatic composition of multi-dimensional icons based on user context data. In embodiments, the system monitors user interactions with existing applications to gather user context data, determines an area available for a multi-dimensional icon in a display space, determines a geometric structure to be utilized for the icon based on user context data, and generates the multi-dimensional icon based on the user context data. In aspects, the system ranks scripts based on the user context data, clusters related scripts based on similarities, ranks the scripts and/or clusters of related scripts, and allocates the scripts based on the rankings to respective faces or cells of the multi-dimensional icon. Gestures stored in a gesture store are assigned to respective faces or cells of the multi-dimensional icon, wherein different user-inputted gestures (e.g., clicks, zoom-in, zoom-out, move-in, move-out, pan, rotate, etc.) detected by the system cause different display functions to be performed for the respective faces or cells of the multi-dimensional icon.

Advantageously, embodiments of the invention provide a technical solution to the problem of presenting information and digital content to a user through a graphical user interface. Embodiments of the invention constitute improvements in the technical field of icon development by enabling the automatic creation and utilization of multi-dimensional icons based on user context data. Aspects of the invention utilize unconventional steps to automatically select one of a plurality of available multi-dimensional shapes and sizes as a basis for the multi-dimensional icon, and automatically assign scripts to cells of the multi-dimensional icon in a manner that provides optimal ease-of-use for a particular user or group of users. Moreover, embodiments of the invention constitute improvements in the technical field of graphical user interfaces (GUIs). For example, in aspects, multi-dimensional icons of the present invention provide improved ease-of-use functionality customized for users based on their historic GUI interactions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
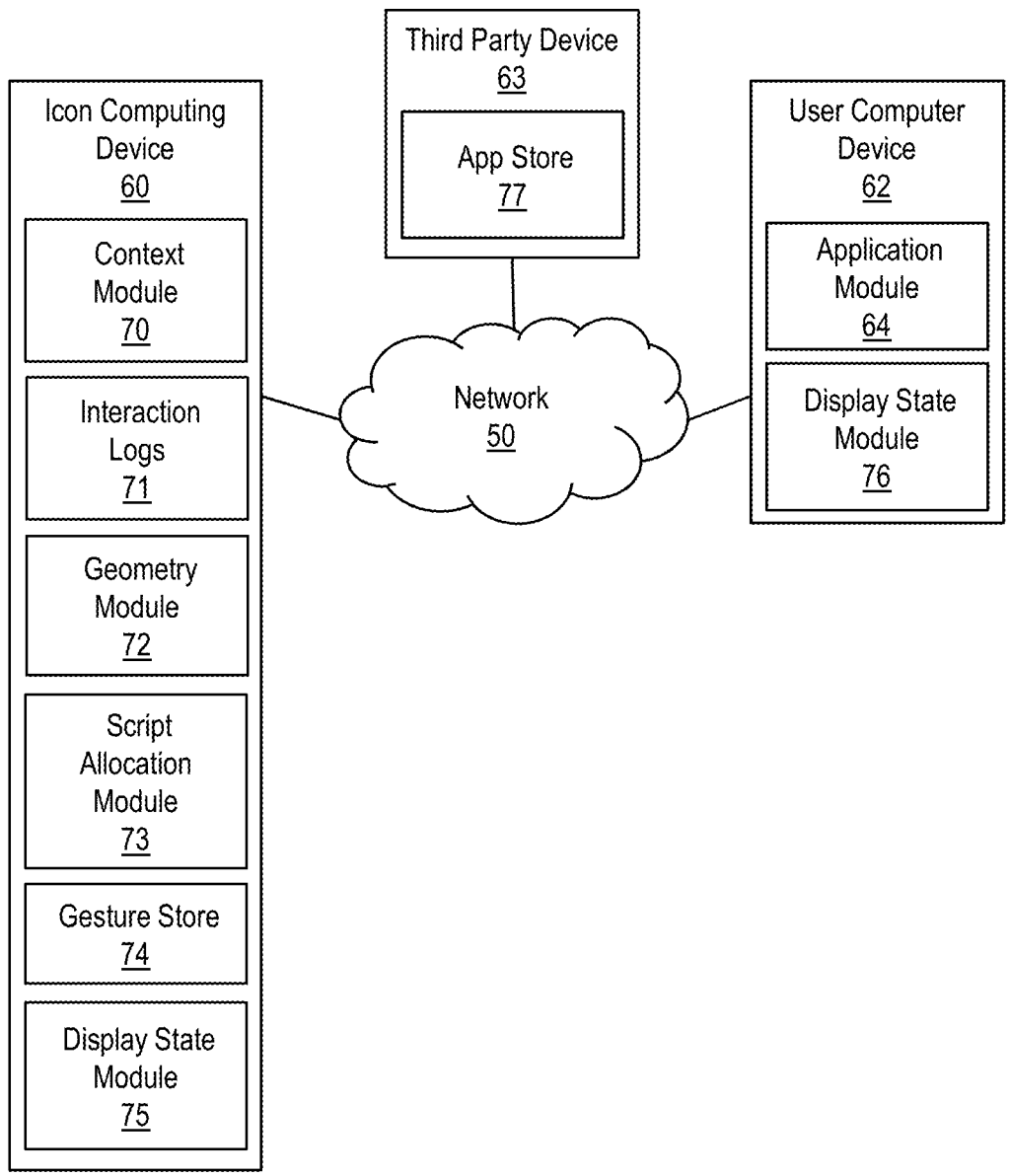
FIG. 2 shows an exemplary environment in accordance with aspects of the invention.

FIG. 2 shows an exemplary environment in accordance with aspects of the invention. The environment includes a network 50 connecting an icon computing device 60 to other devices, such as a user computer device 62 and a third party device 63 (e.g., a software provider). The icon computing device 60 may comprise a computer system 12 of FIG. 1, and may be connected to the network 50 via the network adapter 20 of FIG. 1. The icon computing device 60 may be configured as a special purpose computing device for providing customized multi-dimensional icons to one or more user computer devices 62, or may itself be a user computer device, such as a desktop computer, laptop computer, tablet computer, smartphone, etc.

The network 50 may be any suitable communication network or combination of networks, such as a local area network (LAN), a general wide area network (WAN), and/or a public network (e.g., the Internet). The user computer device 62 may be in the form of the computer system 12 of FIG. 1, and may be a desktop computer, laptop computer, tablet computer, smartphone, etc. In embodiments, the user computer device 62 runs an application program in an application module 64 that provides an interface between the user computer device 62 and the icon computing device 60. The icon computing device 60 may be configured to communicate with plural different user computer devices 62 simultaneously.

Still referring to FIG. 2, the icon computing device 60 may contain one or more program modules (e.g., program module 42 of FIG. 1) executed by the icon computing device 60 and configured to perform one or more functions described herein. In embodiments, a context module 70 of icon computing device 60 is configured to obtain monitoring data for user interactions with one or more program applications over time (e.g., number of user clicks on specific application icons, activities performed with respect to application icons, etc.), and generate interaction logs 71 based on the user interaction data.

In aspects, icon computing device 60 includes a geometry module 72 configured to automatically generate multi-dimensional icons for one or more target program applications based on the interaction logs. In embodiments, the geometry module 72 is configured to: determine an area available to an icon within a graphical user interface (GUI) layout; calculate ease-of-use indicators for a plurality of geometric structures (e.g. an ease-of-use rating per geometric structure based on traces from historic user interaction data); and select a geometric structure for use as an icon, wherein the multi-dimensional icon is generated based on the select geometric structure. In aspects, the geometry module 72 is further configured to: determine if changes to dimensions or structures of the select geometric structure would generate a new ease-of-use indicator that is within acceptable parameters; and modify the select geometric structure to includes changes to dimensions or structures when the new ease-of-use indicator is within acceptable parameters.

Still referring to FIG. 2, in embodiments, the icon computing device 60 includes a script allocation module 73 configured to allocate scripts of the one or more target applications to respective cells (i.e., surfaces or portions of surfaces) of the multi-dimensional icon generated by the geometry module 72. In aspects, the script allocation module 73 is also configured to determine a group of related scripts based on shared characteristics, rank the scripts or group of scripts based on how often each script or group of scripts has been accessed by the user or similar users, allocate the scripts or group of scripts to respective cells of the multi-dimensional icon based on the ranking; and allocate one or more gestures (e.g., zoom in/out, push/pull, pan, rotate, etc.) from a gesture store 74 to the respective cells.

In embodiments, the icon computing device 60 is configured to display multi-dimensional icons directly to a user through a user interface (e.g., display 24 of FIG. 1). In additional embodiments, the icon computing device 60 is configured to send the multi-dimensional icon generated by the icon computing device 60 to one or more user computer devices 62. In aspects, the icon computing device 60 includes a display state module 75 configured to identify user-initiated gestures associated with the cells of the multi-dimensional icon, and modify the display of the multi-dimensional icon based on the user-initiated gesture. In aspects, the user computer device 62 includes a display state module 76 configured to identify user-initiated gestures associated with the cells of the multi-dimensional icon, and modify the display of a multi-dimensional icon based on the user-initiated gesture. In aspects, the display state modules 75 and 76 are configured to share user-initiated gesture data with the context module 70 of the icon computing device 60, and the context module 70 is further configured to update the interaction logs 71 based on the user-initiated gesture data. The icon computing device 60 may be configured to continuously or periodically modify the multi-dimensional icon based on user data in the updated interaction logs 71.

In embodiments, the icon computing device 60 receives one or more program applications from one or more third party devices 63. For example, the third party device 63 may be in the form of an app provider including an app store 77 from which the icon computing device 60 may access program applications and their associated scripts.

In embodiments, the icon computing device 60 and/or user computer device 62 may include additional or fewer components than those shown in FIG. 2. In embodiments, separate components may be integrated into a single computing component or module. Additionally, or alternatively, a single component may be implemented as multiple computing components or modules.

Figure 3A:
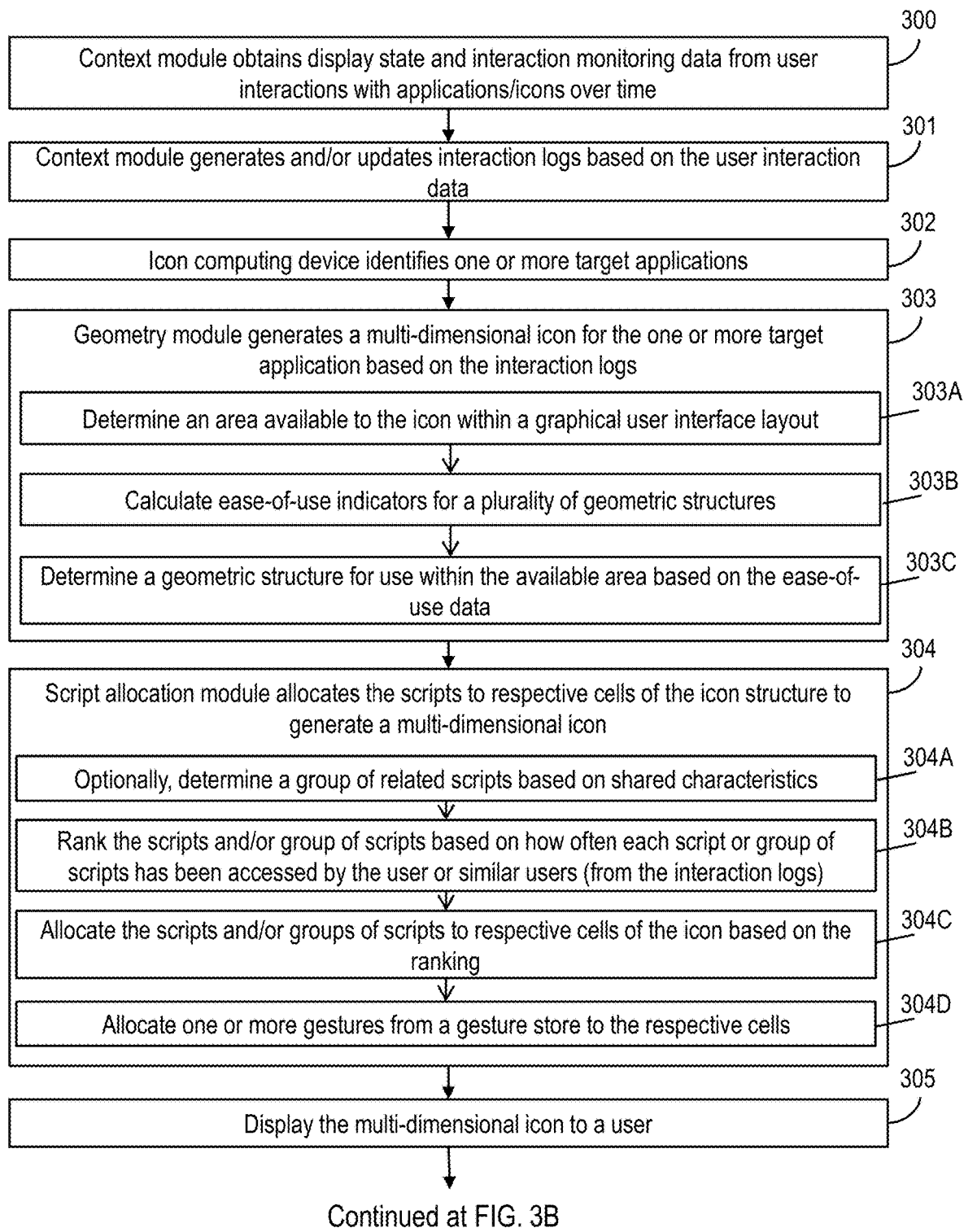
FIGS. 3A and 3B show a flow chart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

Initially, it is noted that the icon computing device 60 may be a user computer device performing the method steps of FIG. 3 for the benefit of one or more users of the icon computing device 60 itself, and/or may be in the form of a server providing icon-generating services for one or more user computer devices 62 via the network 50.

At step 300, the context module 70 of the icon computing device 60 receives display state and user interaction monitoring data associated with user interactions with program applications and/or icons over time (i.e., user context data). The monitoring data may be data generated by a plurality of users and received from one or more user computer devices 62 via the network 50. Additionally or alternatively, the monitoring data may comprise user interaction data from interactions of one or more users with one or more program applications on the icon computing device 60 itself. The monitoring data may include, for example, user-interactions with program applications (e.g., number of clicks on the program application, frequency of use, etc.), and user specific information (e.g., activities users are involved in, which apps users prefer, etc.), such as through the monitoring of conversations, sensor logs, etc., when authorized by the user. Various techniques and tools may be utilized in the gathering of monitoring data. For example, icons may be associated with monitoring code which causes user-initiated movements (e.g., clicking on an icon, zooming in/out, etc.) to be communicated to the context module 70, either directly or indirectly.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

At step 301, the context module 70 of the icon computing device 60 generates and/or updates interaction logs 71 based on the monitoring data received at step 300. In embodiments, the context module 70 maintains interaction logs 71 of all users of one or more target program applications (of the icon computing device 60 or one or more user computer devices 62). In aspects, the context module 70 maintains interaction logs 71 including user-specific information of the users (e.g., user profiles).

At step 302, the icon computing device 60 identifies one or more target applications for use in the present invention. The term target application as used herein refers to application software or one or more "apps" configured for use by the icon computing device 60 or one or more user computer devices 62, which performs a group of coordinated functions, tasks or activities for the benefit of the user. In embodiments, the icon computing device 60 may recognize target application as applications present on the icon computing device 60, applications loaded to the icon computing device 60, and/or applications present on one or more remote user computer devices 62.

At step 303, the geometry module 72 of the icon computing device 60 generates a multi-dimensional icon for the one or more target applications identified at step 302, based on the interaction logs 71. The multi-dimensional icon may be a geometric structure, such as a polyhedron. In embodiments, a multi-dimensional icon is configured by the icon computing device 60 based on a user's historic interactions with a target application and the functions of the target application. In this way, geometry module 72 can generate a multi-dimensional structure having any number of surfaces and/or cells (i.e., content cells), without having to select from predefined geometric structures such as cubes, or the like. The multi-dimensional icon of the present invention may be any geometric structure having a plurality of sides (faces), including a cubic honeycomb structure or a tesseract, for example. Substeps that may be utilized in the implementation of step 303 are discussed below.

At substep 303A, the geometry module 72 determines an area available to the multi-dimensional icon within a graphical user interface (GUI) layout (i.e., available area). In aspects, the geometry module 72 determines a maximum size (e.g., maximum dimensions) of the multi-dimensional icon. The GUI layout may be a layout available to the user through a display of the icon computing device 60, or may be a layout available to a user through a user computer device 62. A number of methods may be utilized in determining the available area. For example, the geometry module 72 may determine a current arrangement of icons on the icon computing device 60 or user computer device 62. In one example, the geometry module 72 may determine the available area based on the number of icons to be displayed within a GUI layout (e.g., more icons implies smaller icons to display within a given layout and less icons implies larger icons may be displayed). Optionally, the geometry module 72 will determine an available area based on device-specific information, such as the size of a display on a particular smartphone model or the like.

At substep 303B, the geometry module 72 calculates ease-of-use indicators for a plurality of geometric structures (e.g., polyhedrons) based on monitoring data from the interaction logs 71. The term ease-of-use indicator as used herein refers to an indicator (numeric or otherwise) representing the degree of ease with which a user may interact with the geometric structure to successfully obtain desired information from an icon. In embodiments, the geometry module 72 utilizes traces from historic user interactions, such as the number of gestures required to access a face of a geometric structure, dwell time, etc., for previous interactions of the user or a similar user with respect to the geometric structure. The term similar user as utilized herein means a first user having one or more commonalities to a second user, which results in the first and second user being commonly categorized or grouped. Data associating users with particular categories or groups of users may be saved in the interaction logs 71. An ease-of-use indicator may be a numeric indicator or rating associated with how easy a geometric structure is to use based on historic user interaction data in the interaction logs 71.

At substep 303C, the geometry module 72 determines an icon structure (e.g. geometric structure) for use within the available area identified at substep 303A based on the ease-of-use data of substep 303B. In one example, the icon structure is a polyhedron dimensioned to fit within a predetermined display area calculated at substep 303A.

Still referring to FIG. 3, at step 304 the script allocation module 73 allocates or assigns scripts to respective cells of the icon structure generated at step 303. The term script as used herein refers to program language for implementing commands. In embodiments, scripts are created and assigned by the script allocation module 73 to update information associated with respective cells of the icons structure. For example, in the case of a target application in the form of a messaging app, the geometry module 72 may generate a six-sided icon structure, wherein each side is associated with a type of information to present to the user. In this example, the script allocation module 73 may create scripts to update each of the six sides of the icon structure, whereby the sides (faces) of the icon structure would each be configured to present up-to-date information to a user. Substeps that may be utilized in the implementation of step 304 are discussed below.

At substep 304A, the script allocation module 73 may optionally determine a group of related scripts based on shared characteristics. For example, related scripts could be clustered together based on features like script tokens, documentation keywords, etc., using topic modeling. Such clusters may be allocated to cells of an icon structure on the same side or face of the icon structure.

At substep 304B, the script allocation module 73 ranks scripts and/or groups of scripts (e.g., determined at substep 304A) based on how often each script or group of scripts has been accessed by the user or similar users. In embodiments, the script allocation module 73 ranks scripts based on the monitoring data in the interaction logs 71. A plurality of ranking techniques may be utilized in the implementation of substep 304B. In aspects, the script allocation module 73 utilizes collaborative filtering techniques to rank scripts or respective groups of scripts.

At substep 304C, the script allocation module 73 allocates the scripts and/or group of scripts to cells of the icon structure based on the ranking of substep 304B. In aspects, the scripts are configured to be executed and/or rendered when the corresponding cell attains rendering size through user interactions such as zoom-in/zoom-out, pan, rotate, move-in/move-out, or other operations. Gestures which perform these operations are stored in the gesture store 74. The term "gesture" as used herein refers to a computer-recognized user interaction with a GUI, which is associated with instructions to modify objects in the GUI. For example, a gesture may combine clicks (e.g., clicks of a mouse) with movements of a pointing device or finger movements in a manner that computer software recognizes as instructions to initiate dragging of an object. Other gestures are recognized by computer software based on a user's interaction with a touch screen, such as detecting one or more fingers interacting with the touchscreen in one of a series of recognized motions or gestures (e.g., pinching of the fingers together or apart).

At substep 304D, the script allocation module 73 allocates one or more gestures from the gesture store 74 to respective cells of the icon structure. In embodiments, the gesture store 74 comprises lists of gestures categorized for use with certain types of information. In aspects, the script allocation module 73 assigns one or more gestures to a cell of the icon structure based on a given context of information assigned to the cell. That is, the gesture assigned to a cell is relevant to the type of script (information) associated therewith. For example, a gesture for zoom-in may not be relevant to all types of data displayed on an icon structure, and would not be assigned to a cell of the icon structure unless relevant to the type of data displayed thereon.

At step 305, the multi-dimensional icon generated at step 304 is displayed to a user. In embodiments, the icon computing device 60 displays the multi-dimensional icon to the user through a display of the icon computing device 60. In other embodiments, the icon computing device 60 sends the multi-dimensional icon to a remote user computer device 62 for display by the remote user computer device 62. The multi-dimensional icon may be stored by the icon computing device 60 and/or the user computer device 62 using existing methods and/or tools.

Figure 3B:
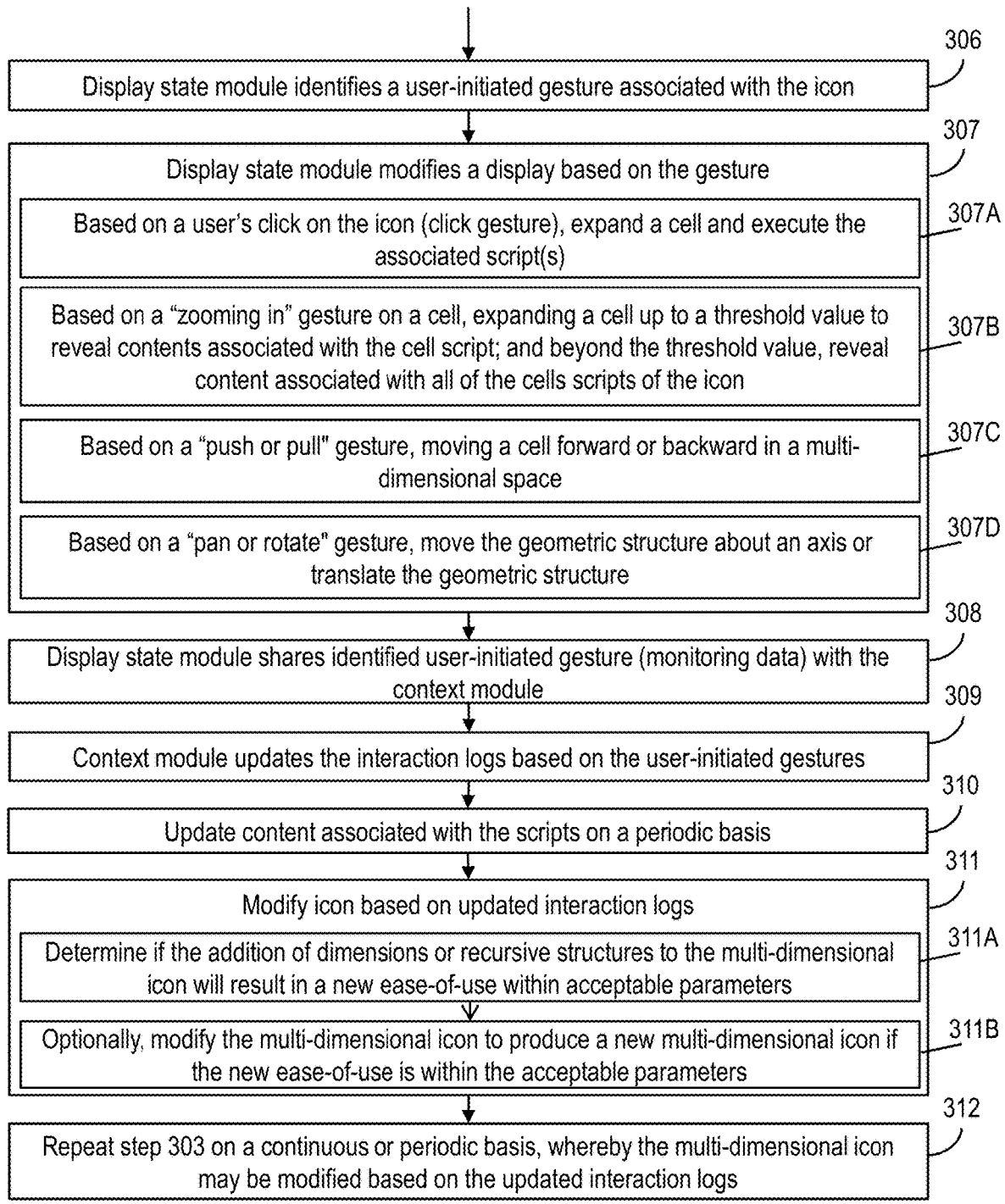

With reference to FIG. 3B, step 306 comprises the display state module 75 or 76 identifying a user-initiated gesture associated with the multi-dimensional icon. For example, the display state module 75 may determine that a user has performed a gesture on a touchscreen (not shown) of the icon computing device 60 associated with the function "zooming in". In another example, the display state module 76 may determine that a user has performed a gesture using a mouse of the user computer device 62 that indicates the user wishes to perform the function of "scrolling down". Existing methods of determining or identifying gestures may be utilized in the implementation of step 306.

At step 307, the display state module 75 or 76 modifies the display of the multi-dimensional icon or content associated with the multi-dimensional icon based on the gesture identified at step 306. For example, the display state module 75 of the icon computing device 60 may determine that a user has performed a gesture related to one of the following. At substep 307A, a user's click (e.g., a mouse click) on a cell of the multidimensional icon results in expansion of the cell and execution of the cell's associated script. At substep 307B, a "zooming in" gesture on a cell of the multi-dimensional icon results in the cell expending in size up to a threshold value to reveal content associated with the cell's script. At substep 307C, a "push or pull" (e.g., move-in/move-out) gesture on a cell results in the cell moving forward or backward in a multi-dimensional display space. This could be performed, for example, on cells in a tesseract. At substep 307D, a "pan or rotate" gesture results in the multi-dimensional icon moving about an axis or translating. It should be understood that other types of gestures and associated functions may be recognized and executed in accordance with step 307. For example, existing gestures and script functions may be utilized in the performance of step 307.

At step 308, the display state module 75 or 76 shares the identified user-initiated gestures determined at step 306 (e.g., monitoring data) with the context module 70 of the icon computing device 60. This monitoring data may be shared on a continuous or periodic basis.

At step 309, the context module 70 of the icon computing device 60 updates the interaction logs 71 based on the user-initiated gestures shared in accordance with step 308 (e.g., monitoring data). In embodiments, the monitoring data is associated with a user who generated the data (e.g., user of the user computer device 62). In this way, the monitoring data stored in the interaction logs 71 may be saved according to specific users and/or categories of users.

At step 310, the icon computing device 60 and/or the user computer device 62 may update content associated with scripts of the multi-dimensional icon on a continuous or periodic basis. For example, the multi-dimensional icon may be in the form of a message app icon, wherein a number of messages received may be represented on a cell of the multi-dimensional icon and may be periodically updated based on a user's associated message app account.

At step 311, the icon computing device 60 may modify the multi-dimensional icon based on updated interaction logs 71. Step 311 may be performed on a periodic or continuous basis. For example, step 311 may be triggered when the interaction logs 71 are updated. Modification of the multi-dimension icon may be based on other triggers, such as receiving an update to a target application. In embodiments, step 311 may be performed with the following substeps.

At substep 311A, the geometry module 72 determines if additional or new dimension or recursive structures of the multi-dimensional icon would result in a new ease-of-use indicator within acceptable parameters. Ease-of-use indicators may be calculated in accordance with substep 303B of FIG. 3A. For example, the geometry module 72 may determine that a target application has been updated to provide new functionality (e.g., additional information), and may further determine whether adding another face to the existing multi-dimensional icon will result in an ease-of-use indicator for the new geometric structure that falls within predetermined acceptable parameters. If the new ease-of-use indicator meets a threshold value, then the geometry module 72 may determine that the multi-dimensional icon may be modified to include the additional side and script associated with the new functionality.

At substep 311B, if the new ease-of-use indicator determined at substep 311A falls within acceptable parameters, the geometry module 72 modifies the multi-dimensional icon to produce a new multi-dimensional icon. In embodiments, the geometry module 72 modifies the multi-dimensional icon to produce a new multi-dimensional icon with additional dimensions or recursive structures. In aspects, the geometry module 72 performs split operations to split existing cells into multiple cells.

At step 312, step 303 is repeated on a continuous or periodic basis, whereby the multi-dimensional icon is modified/created based on the updated interaction logs. In this way, the icon computing device 60 may provide multi-dimensional icons configured for optimal functionality and usability with respect to a specific user or a class of users.

Figure 4:
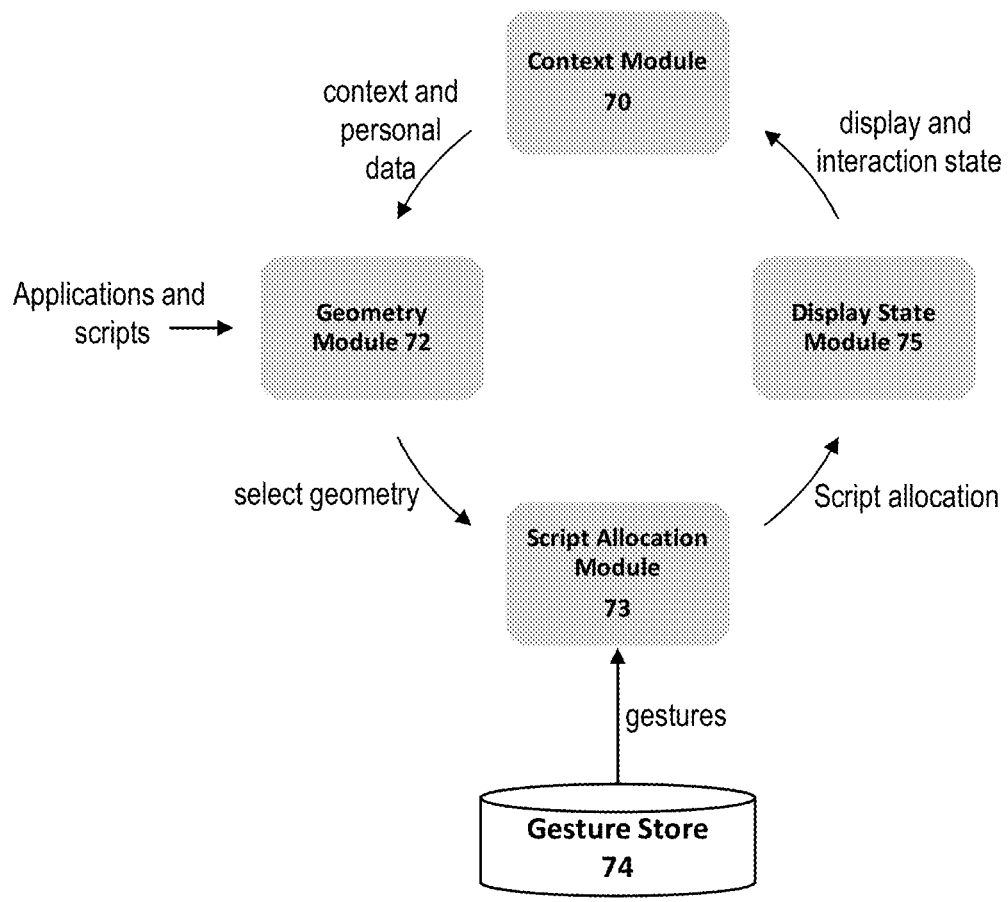
FIG. 4 shows a flow chart in accordance with embodiments of the invention.

FIG. 4 is a flow chart showing components in accordance with embodiments of the invention. The flow chart of FIG. 4 incorporates components of FIG. 2 and illustrates the exchange of information in accordance with steps of FIG. 3.

As illustrated in FIG. 4, a target application and associated scripts may be received at the geometry module 72, and utilized to determine an optimal geometric shape for a multi-dimensional icon for the target application. In accordance with substep 303B of FIG. 3, the geometric shape used for the multi-dimensional icon may be determined based on ease-of-use data generated from context and personal data the geometry module 72 receives from the context module 70 (e.g., saved in the interaction logs 71). The script allocation module 73 allocates scrips of the target application and relevant gestures from the gesture store 74 to respective cells of the multi-dimensional icon in accordance with substeps 304C and 304D of FIG. 3. The multi-dimensional icon with script allocation is displayed to a user, and the display state module 75 recognizes user interaction with the multi-dimensional icon (e.g., script interactions). In accordance with step 308 of FIG. 3B, the display state module 75 shares the monitoring data (e.g., display and interaction state) with the context module 70, which then updates the interaction logs 71 depicted in FIG. 1. Thus, embodiments of the present invention enable the generation of multi-dimensional icons that may be continuously optimized for a user or category of users based on real-time user context data.

Figure 5A:
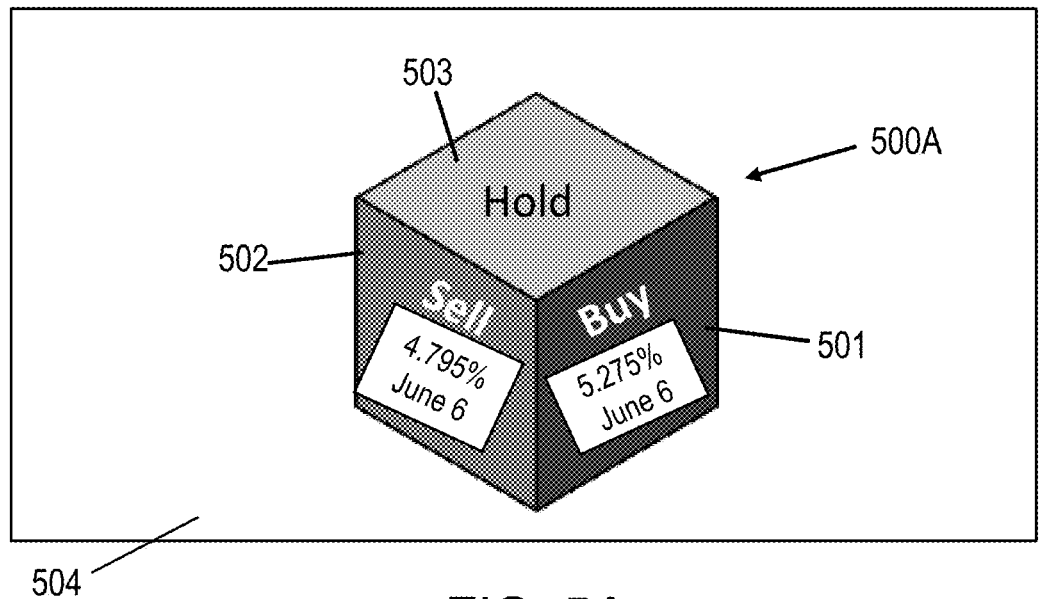
FIG. 5A is a first exemplary multi-dimensional icon of the present invention in the form of a three dimensional cube on a graphical user interface.

FIG. 5A is a first exemplary multi-dimensional icon of the present invention in the form of a three dimensional cube on a GUI. The multi-dimensional icon of FIG. 5A may be generated based on the methods of FIGS. 3A-3B.

As illustrated in FIG. 5A, a multi-dimensional icon 500A includes six sides or cells, three of which are shown at 501, 502 and 503. In the example shown, the multi-dimensional icon 500A is associated with a stock trading application (target application), and is displayed on a GUI 504. Various scripts associated with the stock trading application are assigned to respective cells (sides) of the multi-dimensional icon 500A, including a script for buying depicted on side 501, a script for selling depicted on side 502, and a side for trades on hold depicted on side 503. Information or content associated with the scripts is shown depicted on sides 501 and 502. In accordance with embodiments of the invention, the multi-dimensional icon 500A is automatically generated with the most-used cells 501, 502, and 503 visible on the GUI 504 in an initial default state (i.e., before a user modifies the display of the multi-dimensional icon 500A through user-initiated gestures), based on user-specific context data. Accordingly, the user's interactions with the GUI 504 may be enhanced through the use of multi-dimensional icons 500A of the invention.

Figure 5B:
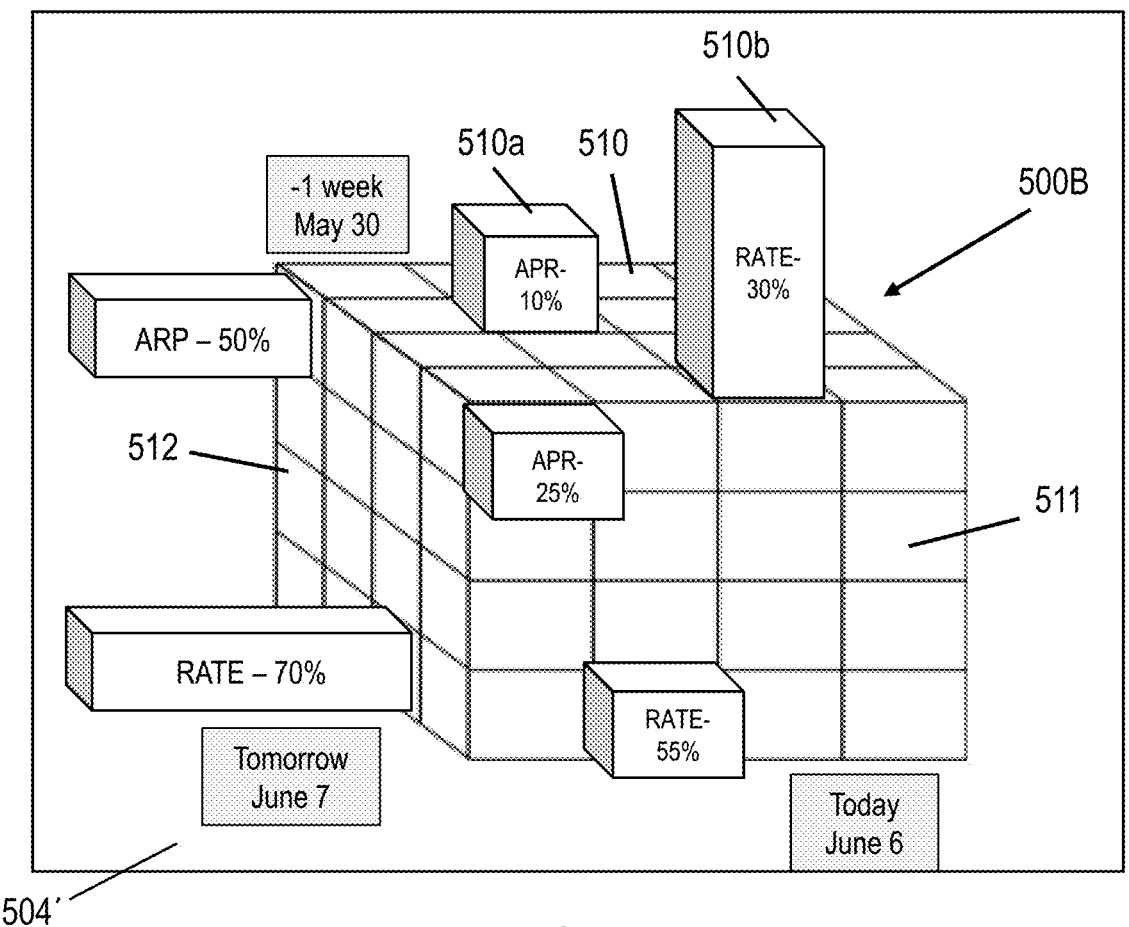
FIG. 5B is a second exemplary multi-dimensional icon of the present invention in the form of a three dimensional cube with a plurality of cuboids extending therefrom.

FIG. 5B is a second exemplary multi-dimensional icon of the present invention in the form of a three dimensional cube with a plurality of cuboids extending therefrom. The multi-dimensional icon of FIG. 5B may be generated using the methods of FIGS. 3A-3B.

As illustrated in FIG. 5B, a multi-dimensional icon 500B includes multiple cells, including the visible main cells 510, 511 and 512. In the example shown, the multi-dimensional icon 500B is displayed in GUI 504' and is associated with an interest rate application (target application), and includes grouped scripts arranged on related cells. More specifically, scripts associated with annual percentage rate (APR) and interest rate (RATE) information from 1 week previous (-1 week) are shown at 510a, and 510b. In this example, a script for information from 1 week previous is depicted at cell 510, a script for the "APR" is shown at cell 510a, a script for the interest rate "RATE" is shown at cell 510b. Additional rate information for "Today" (cell 511) and "Tomorrow" (cell 512) is also depicted, along with related scripts assigned to cells extending therefrom (not separately labeled). In accordance with embodiments of the invention, rate information associated with the cells of the multi-dimensional icon 500B is updated on a periodic basis. For example, the icon computing device 60 may update the information associated with the multi-dimensional icon 500B based on period information received from a remote server (e.g., third party device 63).

It should be understood that a variety of gestures may be associated with the cells of multi-dimensional icon 500B to enable a user to view additional data represented by the cells (e.g., cells 510a-510d). For example, a user may hold a finger against a touchscreen of the icon computing device 60 and drag their finger to rotate the main cube (represented by sides 510, 511 and 512) of the multi-dimensional icon 500B to access data on different sides of the main cube. In another example, the user may double click on a cell (e.g., cell 510b) to expand the information associated with the cell (e.g., receive more information on the interest rate of 30% from 1 week previous).

In this example, the multi-dimensional icon 500B of FIG. 5B is dimensioned to fit within a predetermined icon display space on a display of the icon computing device 60. Further, the scripts are assigned to cells (e.g., 510a, 510b) based on user context data. That is, scripts are assigned to cells based on historic interaction order/patterns of the user with respect to one or more icons. Thus, multi-dimensional icons of the present invention may be utilized to organize and display related information in a manner optimized for a user or category of users, and in a manner which enables the user to interact with the information through user-initiated gestures.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for cognitive composition of multi-dimensional icons. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention. Such methods may comprise: (1) based on the display/interaction feedback and layout state, determining icon geometry complete with faces and cells; (2) monitoring user context to drive the geometrical structure preference and script allocation; (3) assigning scripts to faces/cells based on contextual information (from step 2) such as geometry/script access patterns, script inter-relatedness, etc.; and (4) monitoring display state and interactions to control the rendering of the geometrical structure representing the icon, wherein corresponding scripts will be rendered whenever the faces/cells become visible.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
    generating, by a computing device, interaction logs based on monitoring a user's historic interactions within one or more applications or icons over time;

generating, by the computing device, numeric ease-of-use indicators for each of a plurality of three-dimensional geometric structures based on the interaction logs;

identifying, by the computing device, one or more target applications and associated scripts of the one or more target applications to be associated with an initial multi-dimensional icon to be created, wherein the scripts comprise program language for implementing commands;

automatically determining, by the computing device, a number of sides for the initial multi-dimensional icon to be created based on the ease-of-use indicators;

automatically creating, by the computing device, the initial multi-dimensional icon for the one or more target applications based on the interaction logs, wherein the initial multi-dimensional icon comprises a three-dimensional geometric structure selected from the plurality of three-dimensional geometric structures having the determined number of sides including content cells;

automatically assigning, by the computing device, the scripts of the one or more target applications to respective content cells of the initial multi-dimensional icon;

determining, by the computing device, that new functionality has been added to the one or more target applications; and determining, by the computing device in response to determining the new functionality, whether to automatically add at least one additional side to the initial multi-dimensional icon to form a new multi-dimensional icon having new script associated with the new functionality assigned to the at least one additional side, by comparing a new ease-of use indicator for the new multi-dimensional icon with a predetermined threshold value.

2. The method of claim 1, further comprising displaying, by the computing device, the initial multi-dimensional icon to a user.

3. The method of claim 2, further comprising:
identifying, by the computing device, a user-initiated gesture associated with the initial multi-dimensional icon; and
modifying the displaying of the initial multi-dimensional icon based on the user-initiated gesture.

4. The method of claim 3, further comprising updating, by the computing device, the interaction logs based on the identified user-initiated gesture, thereby generating updated interaction logs.

5. The method of claim 4, further comprising modifying, by the computing device, the initial multi-dimensional icon based on the updated interaction logs, thereby generating an updated multi-dimensional icon having a three-dimensional geometric structure different from the three-dimensional geometric structure of the initial multi-dimensional icon.

6. The method of claim 1, wherein the automatically creating the initial multi-dimensional icon comprises determining an area available to the initial multi-dimensional icon within a graphical user interface layout, and creating the initial multi-dimensional icon based on the area available to the initial multi-dimensional icon.

7. The method of claim 1, wherein the ease-of-use indicators represent a degree of ease with which a user interacts with respective ones of the plurality of three-dimensional geometric structures based on the interaction logs.

8. The method of claim 1, further comprising:
calculating, by the computing device, the new ease-of-use indicator for a new three-dimensional geometric structure for the new multi-dimensional icon and changing, by the computing device, the three-dimensional geometric structure of the initial multi-dimensional icon to the the new three-dimensional geometric structure based on determining that the new ease-of-use indicator meets the predetermined threshold value.

9. A computer program product, the computer program product comprising a computer readable storage medium having program instructions embodied therewith, the program instructions executable by a computing device to cause the computing device to:

calculate ease-of-use indicators for a plurality of three-dimensional geometric structures, wherein the ease-of-use indicators represent a degree of ease with which a user interacts with respective ones of the plurality of three-dimensional geometric structures based on monitored historic user context data of the user;

determine a three-dimensional geometric structure for an initial multi-dimensional icon from the plurality of three-dimensional geometric structures based on the ease-of-use indicators;

generate the initial multi-dimensional icon based on the determined three-dimensional geometric structure, wherein the initial multi-dimensional icon comprises a plurality of application content cells:

rank a plurality of scripts of a plurality of applications based on the historic user context data, wherein the scripts comprise program language for implementing commands;

allocate the scripts to the plurality of application content cells based on the ranking of the scripts;

allocate one or more gestures to the plurality of application content cells, wherein the one or more gestures are each in the form of a computer-recognized graphical user interface interaction;

determine that new functionality has been added to at least one of the plurality of applications; and determine, in response to determining the new functionality, whether to automatically add at least one additional side to the initial multi-dimensional icon to form a new multi-dimensional icon having new script associated with the new functionality assigned to the at least one additional side, by comparing a new ease-of use indicator for the new multi-dimensional icon with a predetermined threshold value.

10. The computer program product of claim 9, wherein the program instructions further cause the computing device to:
display the initial multi-dimensional icon to a user;
identify a user-initiated gesture associated with the initial multi-dimensional icon; and
modifying the displaying of the initial multi-dimensional icon based on the user-initiated gesture.

11. The computer program product of claim 10, wherein the program instructions further cause the computing device to update the historic user context data based on the identified user-initiated gesture to provide updated historic user context data.

12. The computer program product of claim 11, wherein the program instructions further cause the computing device to modify the initial multi-dimensional icon based on the updated historic user context data to provide an updated multi-dimensional icon having a new three-dimensional geometric structure different from the determined three-dimensional geometric structure of the initial multi-dimensional icon.

13. The computer program product of claim 9, wherein the program instructions further cause the computing device to determine an area available to the initial multi-dimensional icon within a graphical user interface layout, wherein generating the initial multi-dimensional icon is further based on the area available to the initial multi-dimensional icon.

14. The computer program product of claim 9, wherein the ease-of-use indicators are based on at least one of the group consisting of: a number of gestures required to access a face of each of the three-dimensional geometric structures; and dwell time for previous interactions of the user with each of the three-dimensional geometric structures.

15. The computer program product of claim 9, wherein the program instructions further cause the computing device to:
calculate the new ease-of-use indicator for a new three-dimensional geometric structure for the new multi-dimensional icon; and
change the three-dimensional geometric structure of the initial multi-dimensional icon to the new three-dimensional geometric structure based on determining that the new ease-of-use indicator meets the predetermined threshold value.

16. A system comprising:
a processor, a computer readable memory and a computer readable storage medium associated with a computing device;
program instructions to identify a target application for which an initial multi-dimensional icon is to be created;
program instructions to determine a three-dimensional geometric structure for the initial multi-dimensional icon based on historic user context data from a plurality of users regarding application display states and interactions of the plurality of users with one or more program applications or icons over time, wherein the three-dimensional geometric structure comprises a plurality of cells associated with content of the target application;
program instructions to automatically create the initial multi-dimensional icon based on the three-dimensional geometric structure;
program instructions to rank a plurality of scripts of the target application based on the historic user context data, wherein the scripts comprise program language for implementing commands;
program instructions to allocate the scripts to the plurality of cells based on the ranking of the scripts; and
program instructions to allocate one or more gestures to the plurality of cells;

program instructions to determine that new functionality has been added to the target application; and
program instructions to determine, in response to determining the new functionality, whether to automatically add at least one additional side to the initial multi-dimensional icon to form a new multi-dimensional icon having new script associated with the new functionality assigned to the at least one additional side, by comparing an ease-of use indicator for the new multi-dimensional icon with a predetermined threshold value, wherein the ease-of use indictor for the new multi-dimensional icon is calculated based on the historic user context data,
wherein the program instructions are stored on the computer readable storage medium for execution by the processor via the computer readable memory.

17. The system of claim 16, further comprising:
program instructions to display the initial multi-dimensional icon to a user;
program instructions to identify a user-initiated gesture associated with a cell of the initial multi-dimensional icon; and
program instructions to modify a display of information in the cell of the initial multi-dimensional icon based on the user-initiated gesture.

18. The system of claim 16, further comprising:
program instructions to update the historic user context data based on the identified user-initiated gesture, thereby generating updated context data; and
program instructions to modify the initial multi-dimensional icon based on the updated context data, thereby generating an updated multi-dimensional icon having a three-dimensional geometric structure different from the three-dimensional geometric structures of the initial multi-dimensional icon.

19. The system of claim 16, further comprising program instructions to determine an area available to the initial multi-dimensional icon within a graphical user interface layout, wherein creating the initial multi-dimensional icon is further based on the area available to the initial multi-dimensional icon.

20. The system of claim 16, wherein the creating the initial multi-dimensional icon further comprises calculating ease-of-use indicators for a plurality of geometric structures based on the historic user context data, and the determining the three-dimensional geometric structure for the initial multi-dimensional icon is based on the ease-of-use indicators.

* * * * *